Feb. 17, 1925.
A. D. CHANDLER
1,526,963
REVAPORIZER
Filed April 17, 1922
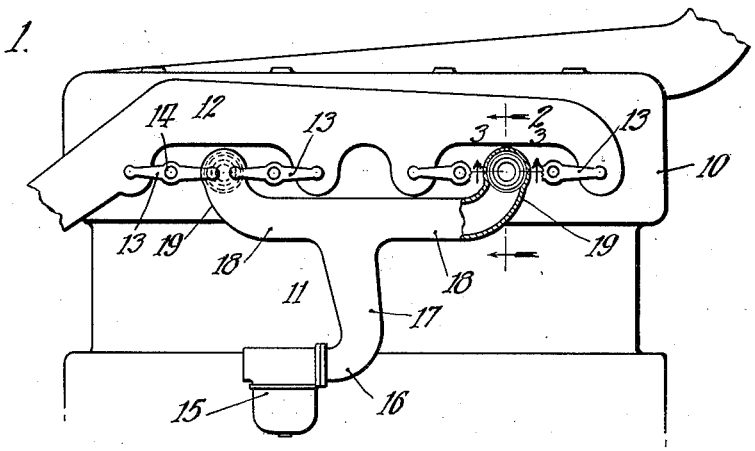
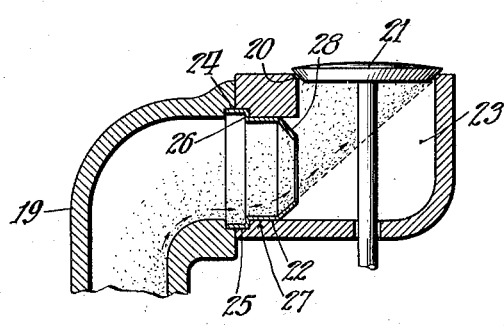 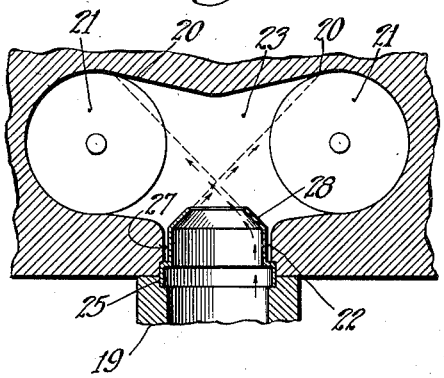
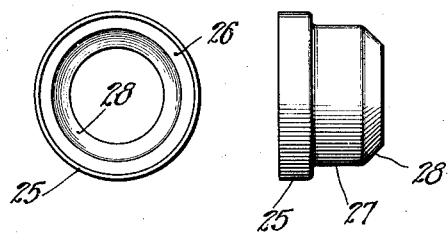
Inventor.
Aquila D. Chandler.
Williams Bradbury
McCaleb & Pierce   Attys.

Patented Feb. 17, 1925.

1,526,963

UNITED STATES PATENT OFFICE.

AQUILA D. CHANDLER, OF CHICAGO, ILLINOIS.

REVAPORIZER.

Application filed April 17, 1922. Serial No. 554,079.

*To all whom it may concern:*

Be it known that I, AQUILA D. CHANDLER, a citizen of the United States, and resident of Chicago, in the county of Cook and State of Illinois, have invented a certain new and useful Improvement in Revaporizers, of which the following is a full, clear, concise, and exact description, reference being had to the accompanying drawings, forming a part of this specification.

This invention relates to a device adapted to be inserted in the intake manifold of an internal combustion engine to effect the re-vaporization of the gasoline and air mixture which passes therethrough.

One of the features of the invention is the provision of a device of this character immediately adjacent to the intake opening to the combustion chamber.

Another feature of the invention resides in the arrangement of the opening restriction flange at an angle such that the wet mixture and unevaporated gasoline passing therethrough will be deflected into the rapidly moving central part of the air column and directly toward the intake valve which is being supplied with combustible mixture.

Another feature resides in the construction which permits the revaporizer to serve the additional function of a packing ring at the point where the detachable portion of the manifold joins the engine case.

Other features and advantages will appear from time to time as the description of the invention progresses.

In the drawings:

Figure 1 is a side elevation of an engine showing the external manifold conduit joined thereto, and also indicating the position of the re-vaporizing device of the present invention;

Figure 2 is a vertical section through a portion of the engine and the adjacent portion of the manifold showing the re-vaporizer;

Figure 3 is a horizontal section through the re-vaporizing device indicating its relation to the adjacent valves;

Figure 4 is an end view of the device detached; and

Figure 5 is a side elevation of the same.

Internal combustion engines in which gasoline is employed as a fuel are provided with carbureters in which air traveling at a high velocity is caused to pass over the carbureter jet, and thus break up the gasoline into minute particles which are mixed through the column of air. Experiments have demonstrated that the air passing through the intake manifold moves several times faster at the center of the column than it does immediately adjacent to the manifold wall. In certain regions of the manifold, the air is found to move very slowly in relation to the main current of air through the center of the manifold. Even though vaporization may be complete when the mixture leaves the carbureter, it is found that in these regions of slow moving air, the particles of gasoline collect, causing a very wet mixture, and sometimes the raw gasoline collects in drops on the manifold walls. This wet mixture and raw gasoline entering the combustion chamber causes fouling of spark plugs, misfiring, incomplete combustion, collection of carbon in the combustion chamber and dilution of oil in the crank case. It also results in a very low efficiency of the engine. It is, therefore, very desirable to provide some means immediately adjacent to the intake opening to the combustion chamber for re-vaporizing this wet mixture and raw gasoline.

In the present invention, applicant has produced a device which may readily be inserted in the intake manifold of a well-known type of automobile engine without modification, and which serves as a re-vaporizer and also takes the place of the usual packing ring employed at the point where the manifold joins the engine case.

It is believed that the further explanation of the invention will best be understood by a description thereof taken in connection with the accompanying drawings.

Referring to the drawings, in which like parts are indicated by the same reference characters in the several views, 10 indicates the engine block having attached thereto the intake manifold generally represented by 11, and an exhaust manifold 12. The manifolds 11 and 12 are held in engagement with the cylinder block by means of the arms 13, each of which has its opposite ends in engagement with the manifolds 11 and 12, respectively, and is secured in position by means of a cap screw 14 which passes through the center of the arm and into the block 10.

At 15 is indicated a carbureter of any known or desired type which communicates through the elbow 16 with the vertically extending portion 17 of the intake manifold.

The portion 17 at its upper end terminates in the diverging laterally extending branches 18, each of which terminates in an upwardly and laterally extending portion 19.

Referring to Figure 2, 20 indicates the valve seat of the intake opening, and 21 the valve arranged to co-operate therewith. By referring to Figures 2 and 3, it will be noted that the portions 19 of the intake manifold terminate in straight, flat edges, which are clamped into engagement with the flat surface of the block 10 by means of the arms 13 and cap screws 14, as above explained. The portions 19, when in position on the block or case 10, will be arranged so that the opening therein is in alignment with an opening 22 in the engine block which communicates with the recess 23, at the opposite ends of which are located the valve seats 20 and valves 21, as indicated in Figure 3.

At a point where the portion 19 of the intake manifold joins the engine block, an annular groove 24 is provided which normally is filled by means of a packing ring, not shown. The re-vaporizer forming the present invention has a cylindrical portion 25 which is inserted in the groove 24 in lieu of the packing ring normally provided, and by means of which the re-vaporizing device is maintained in position. Connected to the part 25 by means of the inwardly extending flange 26 is a cylindrical portion 27 adapted to lie adjacent to the wall of the opening 22 in the engine block which leads into the recess 23. The cylindrical portion 27 at its end adjacent to the recess 23 terminates in the inwardly directed flange 28, thus forming a restricted opening through which the air passing into the combustion chamber must pass.

The wet mixture and the raw gasoline, being drawn in through the intake manifold upon reaching the flange 28, are deflected inwardly toward the center of the air column where the air is moving most rapidly, thus causing the gasoline to be re-vaporized and thoroughly mixed with the inrushing air.

In order that this result may be brought about to the fullest extent, it is necessary that the flange 28 be arranged at such an angle as not to seriously impede the movement of the wet mixture and raw gasoline thereover, but will act to deflect it into the middle of the air column. It has been found that this result is best achieved by arranging the flange 28 at an angle such that vertical planes passing through or tangent to the sides of the flange will pass adjacent to the edge of the valve seats, as indicates by dotted lines in Figure 3. With this inclination of the flange, a plane passing immediately adjacent to the two remote edges of the valve seats will pass tangent to the lower surface of the flange 28, as indicated in Figure 2. This inclination of the flange 28 causes the raw gasoline and wet mixture to be deflected into the middle of the air column and directly toward the valve openings, as previously set forth, without seriously retarding the passage thereof through the manifold. As the re-vaporization takes place immediately adjacent to the intake opening into the combustion chamber, the particles of gasoline do not have an opportunity to again settle out in the nature of a wet mixture or raw gasoline before being drawn into the hot combustion chamber.

While in the drawings and in the above description, applicant has shown one form of his invention which is the preferred embodiment, it is to be understood that slight modifications may be made therein without departing from the spirit of the invention. The invention, therefore, should be limited merely by the scope of the appended claims.

Having now described my invention, what I claim as new and desire to secure by Letters Patent is:

1. The combination with an engine block having an intake opening therein, an intake manifold secured to said block having an opening therein in alignment with the opening in said block, and an annular groove in the inner surface of said openings along the plane where they join, of a re-vaporizer in the form of a separate unit positioned within said openings, said re-vaporizer comprising an annular ring positioned within said groove, a substantially cylindrical portion extending into the opening in said block, and an inwardly tapered flange integral with said cylindrical portion.

2. The combination with an engine block having an intake opening therein, and an intake manifold secured to said block having an opening therein in alignment with the opening in said block, of a re-vaporizer in the form of a separate unit positioned within said openings, said re-vaporizer comprising an annular ring arranged to snugly engage the inner surface of one of said openings, a substantially cylindrical portion positioned in the opening in said block, and an inwardly tapered flange integral with said cylindrical portion.

3. The combination with an engine block having an intake opening therein, of a separate re-vaporizer unit positioned within said opening, said re-vaporizer including a substantially cylindrical portion, and an inwardly directed flange integral therewith.

4. The combination with an engine block having an intake opening therein, a valve recess with which said opening communicates, and a pair of valve openings in said recess, of a re-vaporizer in the form of a readily installed accessory positioned within said opening, said re-vaporizer including a substantially cylindrical portion positioned adjacent to the inner wall of said opening, and an inwardly tapered flange fixed to said cylindrical portion, said flange being arranged at an angle such that planes tangent to the opposite edges thereof at right angles to the plane of the valve openings pass substantially tangent to the remote edges of the valve openings, respectively.

5. The combination with an engine block having an intake opening therein, a valve recess in said block with which said opening communicates, a pair of intake valve openings in said recess, an intake manifold secured to said block having an opening therein in alignment with the opening in said block, and an annular groove in the inner surface of said openings along the plane where they join, of a re-vaporizer in the form of a separate unit positioned within said openings, said re-vaporizer comprising an annular ring positioned within said groove, a substantially cylindrical portion extending into the opening in said block, and an inwardly tapered flange integral with said cylindrical portion, said flange being arranged at an angle such that planes tangent to the opposite edges thereof at right angles to the plane of the valve openings pass substantially tangent to the remote edges of the valve openings, respectively.

6. In a re-vaporizer, an annular flange adapted to snugly engage the inner surface of an engine intake opening, a substantially cylindrical portion fixed to said flange, and an inwardly tapered flange fixed to said cylindrical portion.

In witness whereof, I hereunto subscribe my name this 7th day of April, 1922.

AQUILA D. CHANDLER.

Witnesses:
DAGMAR PETERSON,
EMILE BOURGEOIS.